United States Patent
Bilchinsky et al.

(10) Patent No.: US 10,531,525 B2
(45) Date of Patent: Jan. 7, 2020

(54) DEVICE AND METHOD FOR HEATING USING RF ENERGY

(71) Applicant: Goji Limited, Hamilton (BM)

(72) Inventors: Alexander Bilchinsky, Monosson-Yahud (IL); Eran Ben-Shmuel, Savyon (IL); Daniella Atzmony, Shoham (IL)

(73) Assignee: GOJI LIMITED, Hamilton (BM)

( * ) Notice: Subject to any disclaimer, the term of this patent is extended or adjusted under 35 U.S.C. 154(b) by 745 days.

(21) Appl. No.: 15/183,199

(22) Filed: Jun. 15, 2016

(65) Prior Publication Data

US 2016/0353528 A1 Dec. 1, 2016

Related U.S. Application Data

(63) Continuation of application No. 13/924,027, filed on Jun. 21, 2013, now Pat. No. 9,374,852, which is a continuation of application No. 12/920,782, filed as application No. PCT/IL2009/001058 on Nov. 10, 2009, now Pat. No. 8,492,686.

(60) Provisional application No. 61/193,248, filed on Nov. 10, 2008, provisional application No. 61/253,893, filed on Oct. 22, 2009.

(51) Int. Cl.
  *H05B 6/68* (2006.01)
  *H05B 6/64* (2006.01)
  *H05B 6/70* (2006.01)
  *H05B 6/66* (2006.01)

(52) U.S. Cl.
  CPC ............ *H05B 6/68* (2013.01); *H05B 6/6447* (2013.01); *H05B 6/664* (2013.01); *H05B 6/687* (2013.01); *H05B 6/688* (2013.01); *H05B 6/70* (2013.01); *H05B 6/705* (2013.01); *Y02B 40/143* (2013.01); *Y02B 40/146* (2013.01)

(58) Field of Classification Search
  CPC ............... G06F 1/1626; G06F 1/1652; G06F 2203/04102; G06F 2203/04803; G06F 3/0412; G06F 3/04817; G06F 3/0487; G06F 3/04883; G06F 3/04886; G09G 2380/02; H04M 1/0268; H05B 6/6447; H05B 6/664; H05B 6/68; H05B 6/687; H05B 6/688; H05B 6/70; H05B 6/705; Y02B 40/143; Y02B 40/146
  USPC ....................................................... 219/678
  See application file for complete search history.

(56) References Cited

U.S. PATENT DOCUMENTS

| | | | | |
|---|---|---|---|---|
| 5,616,268 A | * | 4/1997 | Carr ...................... | A61M 5/445 219/687 |
| 7,520,244 B2 | * | 4/2009 | Yamagishi .............. | C23C 16/36 118/723 E |
| 2005/0053118 A1 | * | 3/2005 | Stephan ............... | G01K 11/006 374/122 |
| 2008/0290087 A1 | * | 11/2008 | Ben-Shmuel ............ | A23L 3/01 219/748 |

* cited by examiner

*Primary Examiner* — Dana Ross
*Assistant Examiner* — Joseph W Iskra
(74) *Attorney, Agent, or Firm* — Finnegan, Henderson, Farabow, Garrett & Dunner, LLP

(57) ABSTRACT

A method of heating and/or thawing using an RF heater is described. In some cases the heating differentially heats portions according to their dissipation ratios. Optionally, this avoids dissipating large amounts of energy into thawed portions while frozen portions are still extant and heat slowly. Optionally, this prevents overheating of thawed portions.

10 Claims, 10 Drawing Sheets

DEVICE AND METHOD FOR HEATING USING RF ENERGY

RELATED APPLICATIONS

This application is a continuation of U.S. patent application Ser. No. 13/924,027, filed Jun. 21, 2013, which is a continuation of U.S. patent application Ser. No. 12/920,782, filed on Sep. 2, 2010, which is a U.S. national stage entry under 35 U.S.C. § 371 from PCT International Application No. PCT/IL2009/001058 filed Nov. 10, 2009, and claims the benefit under 119(e) of U.S. Provisional Patent Application No. 61/193,248 filed 10 Nov. 2008 and U.S. Provisional Patent Application No. 61/253,893 filed 22 Oct. 2009 and is related to International Application No. PCT/IL2009/001057 International Application No. PCT/IL2009/001059 filed on 10 Nov. 2009. All of the previously filed applications are hereby incorporated by reference in their entirety.

FIELD OF THE INVENTION

The present application, in some embodiments thereof, is concerned generally with dissipation of electromagnetic (EM) energy in a load, and specifically with using EM energy for thawing, heating and/or and cooking.

BACKGROUND OF THE INVENTION

The microwave oven is a ubiquitous feature in modern society. However, its limitations are well known. These include, for example, uneven heating and slow absorption of heat, especially for thawing (or defrosting). In fact, ordinary microwave ovens, when used for thawing and even heating, result in foods in which the one part may be generally warm or even partly cooked or overcooked before another part is even defrosted. Thawing and warming of objects using conventional microwave ovens typically suffers from uneven and typically uncontrolled dissipation of energy in the load.

SUMMARY OF THE INVENTION

The present invention, in some embodiments thereof, stems from the inventors' realization that equal dissipation of energy into a load during thawing may result at times in a non-even temperature profile of the load, and possibly in thermal runaway phenomena (in which the temperature in one part of the load increases much faster than in other parts). In particular, thermal runaway can result in a situation where a change in temperature of a warmer portion beyond a certain point causes an increased rate of change in temperature in that portion thereby continuously increasing the temperature gap.

In an exemplary embodiment of the invention, energy dissipation is controlled in one or more of three manners: (a) reducing maximum dissipated energy (e.g., at all or a portion of the transmitted frequencies); (b) causing more efficient energy dissipation into the load at frequencies where the dissipation rate is low as compared to frequencies where dissipation is high; and/or (c) monitoring the load closely enough to avoid overheating between monitoring acts. Optionally, less power is differentially dissipated in particular in portions of the load where thermal runaway is a greater danger, for example, in liquid water portions.

In an exemplary embodiment of the invention, rather than use/measure the dissipation rate, what is measured is a dissipation ratio (e.g., ratio between input and dissipation) or even a normalized dissipation ratio, normalized, for example, to a range of 0 to 1 or normalized to an average dissipation ratio.

In an exemplary embodiment of the invention, the dissipated power v. dissipation ratio graph is quasi-Gaussian, rather than an essentially reverse correlation. At low dissipation ratios it may be desirable to dissipate more power but such dissipation is limited by the poor dissipation ratio, even if the maximal available power setting is used. At the highest dissipation ratio it may be desirable to transmit nothing (or very little). The intermediate levels are affected by both tendencies, hence the quasi Gaussian shape.

In an exemplary embodiment of the invention, it is assumed that each frequency represents a load portion or portions. A same portion of the load may absorb at multiple frequencies. In an exemplary embodiment of the invention, it is assumed that the dissipation at a frequency is commensurate with the dissipation in those portions.

In an exemplary embodiment of the invention, the maximum applied energy (hpl) is calculated based on spectral information of the load. Optionally or alternatively, the selection of power level per frequency is selected according to such properties. Optionally or alternatively, selection of power per frequency is based on a selection of a subset of frequencies in which to have more power dissipate into the load. Optionally or alternatively, selection of power per frequency, for each frequency, is based on analysis of the spectral information acquired at all frequencies of that band, or based on spectral information acquired at all frequencies that are considered to be coupled to the load (e.g., without bands that are with a high Q values, e.g. above 0.25%, or 0.5% or 1%).

In an exemplary embodiment of the invention, the spectral information is analyzed to distinguish thawed and unthawed portions. Optionally, such distinction is based on general properties of the spectral information, rather than on a frequency by frequency analysis, for example, assuming a bimodal distribution of a spectral dissipation image between ice and water can allow to separate ice and water on a gross basis according to matching to the expected bimodal distribution. At times, the there is an overlap between the two modes, wherein a frequency dissipates to some extent in both water and ice portions of the load.

In an exemplary embodiment of the invention, the thawing protocol parameters depend on load size and/or volume, for example, correcting for a method of estimating thawed water/ice content which may be skewed by larger absolute ice content of a large target and/or if it's initial temperature is near thawing.

In an exemplary embodiment of the invention, the identification of water content/high dissipation frequencies is based on an assumption that ice has a lower dissipation than water. Optionally, a threshold value, relative or absolute, is used to detect such frequencies. Optionally, a threshold is provided for relatively pure ice, above which it is assumed the material is a mixture of ice and water. Optionally, the system in general is designed so that non-load portions have a very low dissipation or no energy or very little energy is transmitted in frequencies that are expected to dissipate therein. Optionally, a high threshold is provided, above which it is assumed the absorbing material is water and therefore low or no power should be transmitted causing low or no power dissipation into the load. Optionally, intermediate dissipation ratio frequencies are tracked based on an assumption that they reflect mixed water ice portions which may all thaw out and/or in which there is an intermediate danger of the water content having a runaway thermal event. Optionally, such intermediate frequencies receive intermediate power levels.

In an exemplary embodiment of the invention, large ice sections (with low dissipation in all frequencies) are not over compensated for (e.g., not assumed to be water and therefore receive low power), by detecting, based on the spectral information, that there is large ice and providing more energy in those frequencies, until indications of small ice sections start appearing in the spectral information. For example, energy transmission in frequencies with intermediate dissipation ratios is not reduced to the same extent as that of frequencies with high dissipation ratios, in case such frequencies represent large ice.

In an exemplary embodiment of the invention, these and/or other parameters, such as thresholds, power/frequency ratios and times depend on load properties and/or desired heating effect. Optionally, a table with various options is stored in memory and a user can select. Optionally or alternatively, a series of functions are provided and applied according to user or automatic selection.

Optionally or alternatively, the maximum power level is calculated using trial and error methods and/or as a function of average dissipation in a load.

In an exemplary embodiment of the invention, the maximum applied power level and/or frequency dependent power level are updated during thawing or other heating or energy applying process. Optionally, this updating occurs a plurality of times (for example, practically continuously, such as 1000/sec or 2/sec or even once every 5 seconds or more) during the thawing process.

In an exemplary embodiment of the invention, the time between scans and/or dissipation between scans is selected to reduce the danger of overheating and/or thermal runaway. Optionally, the power levels used, thresholds, scanning rate and/or other parameters depend on scenarios to be avoided. In one example, if a small amount of water is mistake for a large amount of ice (and thus irradiated with high power), the scan settings and/or hpl are selected so that the next scan would detect such an effect (caused by the amount of water growing in a manner that it would not be mistaken for ice.

Optionally, the load and/or cavity are manipulated to improve the spectral information, for example, to assist in distinguishing water from ice. This may allow the calculation of a higher power level for transmission (e.g. average) and/or a higher dissipation ratio (e.g. average or minimal) and thus allow a faster thawing with sufficient quality. For example, the position of the load in the cavity may be changed (e.g. by rotating or agitating a plate on which the load is placed) and the spectral information would be compared between a plurality of positions. Optionally, energy transmission will take place with the load positioned such that the spectral information acquired is most useful for the ice/water distinction (e.g., having the highest calculated hpl).

In an exemplary embodiment of the invention, a minimum low power level is dissipated at frequencies where power was previously applied, to prevent cooling and/or refreezing of such thawed portions. Optionally or alternatively, the maximum power allowed to dissipate into the load at a given frequency between a first and second acquisition of spectral information is such that a thawed portion would not heat up much above thawing before power is stopped based on change in spectral information.

In an exemplary embodiment of the invention, rather than apply exact amounts of power, use is made of frequent feedback. Optionally or alternatively, the method of applying power takes into account properties of the power amplifiers used.

The inventors hypothesize that uneven temperature profiles may be caused or exacerbated by one or more of the possibilities detailed below. However, it should be noted that the methods described herein may also be applied independent of such hypothesis. Furthermore, it is noted that in accordance with some embodiments of the invention, what is avoided is not uneven temperatures per se, but rather overheating or danger of overheating in significant parts of the load (e.g., 0.1%, 0.5%, 1%, 2%, 5%, 10% or intermediate percentages, e.g., depending on application, user desires).

(a) Non-uniform composition. A real-life load normally comprises different materials (e.g. fat, bone, skin and muscle in a chicken portion or air pockets within ground meat or icicles forming between shrimp in a shrimp package) which have different specific heat ($C_p$) and/or different latent heat (L). In such case, equal dissipated energy may result in unequal temperatures (as RF heating is normally faster than heat transfer by conduction within the object). In accordance with some embodiments of the invention this is taken into account (e.g., using a preset table) when determining power levels for load portions associated with such different materials.

(b) Non-uniform thermal state and heat transfer behavior. The load may have different temperatures at different locations (either initially or during thawing). This may be due for example to non-equilibrated cooling before thawing commenced (e.g. the interior being warmer than the exterior, if freezing was incomplete or vice versa, if a frozen object was briefly exposed to a higher temperature than its own) or to exposure of the load's surface to different environments, before or during heating (warm air, internal and external convection currents, cold plate, possibly during heating) or to heterogeneous composition as mentioned above or to an irregular shape of the load (with some portions being thinner than others), or to an irregular shape of the load, e.g., whereby different portions might have a different surface/volume ratios, or a combination of two or more of the aforesaid. This may result in a relatively warm portion(s) passing through phase change long before the cooler portion(s) will have begun the phase change (even if the load is 100% homogeneous and the energy dissipation to all portions thereof is identical). In an exemplary embodiment of the invention, the heating protocol takes such uneven temperatures and/or heat dissipation into account during heating. Optionally, such taking account is automatic by directing most power to ice portions.

(c) Temperature-dependent heating. For many types of material the amount of energy required to engender phase change will cause a significant increase in temperature (e.g. by 20, 40 or even 80° C.) if applied to the matter after phase change. As a result, equal dissipation of energy in frozen material may result in the warmer portion(s) overheating before phase change will have been completed in the cooler portion(s). In an exemplary embodiment of the invention, such overheating is avoided by reducing power to areas that are sensitive to overheating and/or where power/heat ratio indicates faster heating material.

It is noted that the above may apply at times also to heating of a load where there is no thawing, whether there is phase change (e.g. boiling) or not (e.g. raising the temperature of a load and/or maintaining it at a desired level).

In accordance with an exemplary embodiment of the invention, uneven heating, or at least thermal runaway, are avoided, at least to some extent, if significantly more RF energy is dissipated in sections that did not undergo phase change than in sections that have already phase changed. One particular example is dissipating more power in thawed portions than in non-thawed portions, fat and/or other non-frozen materials.

In an exemplary embodiment of the invention, such uneven distribution of energy dissipation is achieved by transmitting a high power at frequencies having a relatively low dissipation ratio or frequencies that dissipate primarily in ice, whilst transmitting a low (or even no) power at frequencies that have a relatively high dissipation ratio or frequencies that dissipate primarily in water.

In accordance with exemplary embodiments of the invention, it is noted that the dissipation of a given frequency in different load portions (e.g. water and in ice or load portions having different dissipation ratios for any other reasons, including, for example, polarity, lipid content and water content) depends on many factors, including the load composition, size, shape, location and orientation within the cavity and the exact temperature and phase in different portions of the load. Under different conditions a given frequency may dissipate mainly in water, mainly in ice or in both. However, the inventors discovered that when obtaining spectral information from the cavity, an analysis of the obtained information may be used to deduce a useful thawing protocol and/or may reflect the pattern of dissipation in water and/or ice that may occur.

In the context of the present application, the term "spectral information" means the interaction data for RF in the chamber at different frequencies and/or with the load in the chamber, for example, sweeping the frequency at a constant or changing power using one or more cavity feeds at a time and measuring the reflected power received by said one or more cavity feeds, optionally taking into account the power actually transmitted into the cavity at each frequency. At times one feed is transmitting while one or more other feeds (or all other feeds) measure the reflected power. At times, the process is repeated for one or more of the plurality of feeds. A non-limiting example is the obtaining of a spectral image as described in PCT publication WO07/096878.

In an exemplary embodiment of the invention, a restraining function is used for calculating the RF power, to transmit into a cavity such that a smaller amount of energy (or no energy at all) dissipates into the portions that have a relatively high dissipation ratio, while a larger amount of energy will dissipate into the portions that have a relatively low dissipation ratio. In an exemplary embodiment of the invention, the function is selected so that energy dissipated per volume unit (or the dissipation per mass unit) is smaller for portions with a high dissipation ratio, as compared to portions with a low or intermediate dissipation ratio. In an exemplary embodiment of the invention, a restraining function is used for calculating the RF power to transmit into a cavity such that a smaller amount of energy (or no energy at all) will dissipate into the load by frequencies that have a relatively high dissipation ratio, while a larger amount of energy will dissipate into the load by frequencies that have a relatively low dissipation ratio. In an exemplary embodiment of the invention, the heating automatically and/or inherently adjusts for portions of the load becoming thawed (or partially thawed) (or frequencies that increase in dissipation ratio into the load) and thereupon reclassified as "high dissipation portions (or frequencies)" (or "intermediate dissipation portions (or frequencies)"). For example, by performing a frequency scan or sweep after a heating session, changes may become apparent in the dissipation ratios of at least some of the used frequencies, which changes correlate at least in part with phase changes in respective portions of the load. By recalculating the transmission protocol based on the newly acquired spectral information, the device can self adjust for the progress of thawing (and/or changes in the location of the load if it shifts during operation).

In an exemplary embodiment of the invention, the transmitted energy at each frequency is selected such that the amount of energy that will dissipate into the load at a frequency having a high dissipation ratio (e.g. 70% or more or 80% or more) may be 50% or less than the energy that is dissipated into the load at frequencies that have a relatively low dissipation ratio (e.g. 40% or less or 30% or less). At times this would be 20% or less, 5% or less, 0.1%, even 0% of the energy dissipated in frequencies having a low dissipation ratio.

While the above has focused on thawing, it may be applied to other phase changes or situations where the relationship between power dissipation and heating rate changes abruptly and/or in situations where it is desired to avoid thermal runaway (e.g., when trying to uniformly heat an object containing both low dissipation ratio and high dissipation ratio sections, commensurate with a high and low specific heat, and/or a high and low latent heat, respectively). In addition, multiple (e.g., 3, 4, 5, or more) differently heated portions may be provided. At times, the plurality of portions of the working band used for heating do not include frequencies (or portions) where no energy is transmitted. Optionally, different frequencies are assigned to such multiple portions based on their dissipation ratio. However, it is noted that thawing is a point of particular interest due to the large amount of energy required for the phase change as compared to the energy required for temperature change and considering that food is often stored frozen and served or prepared thawed. Similarly, portions which might be damaged by overheating and/or portions which are unacceptable if not heated enough, may be additionally or alternatively of interest. At times, there might be a desire to heat different portions differently for any other reason (e.g. to heat (e.g. cook) one portion but not another or to reach different final temperatures).

It is also noted that while the underlying strategy in some embodiments is to tailor the power per volume unit according to the effect of such power on the targeted load portion, in accordance with some embodiments this is achieved indirectly by targeting specific frequencies and tailoring power according to the dissipation in those frequencies, without directly ensuring a certain power level per unit volume.

There is provided in accordance with an exemplary embodiment of the invention, a method of heating a load in using RF, comprising:

(a) providing a load having an overheating temperature point;

(b) selecting a maximum power to be dissipated in the load in a manner which avoids overheating; and (c) applying RF power to said load at a plurality of different frequencies, said power being different at different frequencies and below said maximum power at all frequencies.

In an exemplary embodiment of the invention, said selecting comprises trading off uniformity of heating with speed of heating. At times, the maximum power selected might be the maximum power available by the device at any given frequency multiplied by the dissipation ratio at that frequency. Optionally or alternatively, applying RF power comprises causing a phase change in said load. Optionally, said phase change comprises thawing. Alternatively said phase change comprises evaporation.

In an exemplary embodiment of the invention, said phase change comprises a ratio of at least 1:20 between the effectiveness of power to cause phase change in a load portion unit and the effectiveness of the power to increase the temperature of a load portion unit that has phase-changed by 1 degree Celsius.

In an exemplary embodiment of the invention, said power is selected and applied in a manner which avoids thermal runaway in said load during said applying.

In an exemplary embodiment of the invention, selecting a maximum power comprises selecting a maximum power as a function of an average dissipation of the load.

In an exemplary embodiment of the invention, selecting a maximum power comprises selecting a maximum power as a function of spectral information of the load.

In an exemplary embodiment of the invention, the method comprises selecting a minimum power to apply at frequencies where power is applied.

In an exemplary embodiment of the invention, the method comprises selecting a power for each of said plurality of frequencies. Optionally, selecting a power comprises selecting one or more sub-bands of frequencies to power, within a wider bandwidth of a system used for applying said RF power.

In an exemplary embodiment of the invention, the method comprises repetitively retrieving spectral information of said load and using said information to guide at least one of said selecting and said applying.

In an exemplary embodiment of the invention, applying said RF power comprises applying power at a frequency with an inverse ratio to a dissipation ratio at said frequency.

In an exemplary embodiment of the invention, the method comprises avoiding applying power at frequencies with a dissipation ratio below a low threshold level.

In an exemplary embodiment of the invention, the method comprises avoiding applying power at frequencies with a dissipation ratio above a high threshold level.

In an exemplary embodiment of the invention, said applying is responsive to identifying ice in said load and wherein said identifying comprises identifying according to frequencies with low dissipation. Optionally, identifying is compensated for the mass of the load. Optionally or alternatively, identifying is according to a threshold which is dependent on the load type.

There is provided in accordance with an exemplary embodiment of the invention, apparatus configured to carryout the selecting and applying of any of the preceding claims.

There is provided in accordance with an exemplary embodiment of the invention, a method of heating a load using RF, comprising:

(a) providing a load having a different dissipation ratios at different portions;

(b) setting frequency/energy pairs such that in heating the load less energy (or power) is transmitted at frequencies that dissipate at a first dissipation ratio than at frequencies that dissipate at a second dissipation ratio, wherein said second dissipation ratio is higher than said first dissipation ratio in a given transmission cycle; and (c) applying said frequency power pairs to heat said load.

There is provided in accordance with an exemplary embodiment of the invention, a method of heating a load using RF, comprising:

(a) providing a load having a different rate of heating per transmitted energy (h/te) applied at different portions;

(b) setting frequency/energy pairs such that in heating the load less energy per unit volume of portions is transmitted at frequencies that correspond to portions with a high h/te rate than at frequencies corresponding to portions with a low h/te; and (c) applying said frequency power pairs to heat said load.

There is provided in accordance with an exemplary embodiment of the invention, a method of heating a load using RF, comprising:

(a) providing a load having different dissipation ratios at different portions;

(b) setting frequency/power pairs such that in heating the load a different power application protocol is applied at frequencies that dissipate at a first dissipation ratio and at frequencies that dissipate at a second dissipation ratio; and (c) applying said frequency/power pairs to heat said load.

In an exemplary embodiment of the invention, said applying comprises applying more power for a portion with a lower dissipation ratio. Optionally or alternatively, a difference between two or more power application protocols comprises a total amount of energy per load amount to be dissipated in their respective load portions. Optionally or alternatively, a difference between two or more power application protocols comprises a tradeoff between heating velocity and homogeneity.

In an exemplary embodiment of the invention, said setting comprises associating frequencies into sets associated with dissipation ratios; and wherein said setting comprises selecting frequency/power pairs according to said sets. Optionally, said setting comprises selecting a power level per set. Optionally or alternatively, said associating comprises associating based on information in addition to said dissipation ratio. Optionally or alternatively, at least one set includes a plurality of non-continuous frequency ranges with at least one frequency belonging to another set between said ranges. Optionally or alternatively, at least one set corresponds to frozen material. Optionally or alternatively, associating comprises associating into at least three sets. Optionally or alternatively, said associating frequencies into sets is performed by associating into a preset number of sets. Optionally, said preset number of sets is between 2 and 10 sets.

In an exemplary embodiment of the invention, associating comprises associating into at least two sets each having a significant amount of dissipated energy or power assigned to a plurality of frequencies therein, said significant amount being at least 7% of a total dissipated power in a heating cycle being assigned to a set. Optionally or alternatively, at least two of said sets have a non-zero transmitted power and wherein an average dissipated power of one set is at least twice that of another set. Optionally or alternatively, at least two of said sets have a non-zero transmitted power and wherein an average dissipated power of one set is at least five times that of another set. Optionally or alternatively, at least two of said sets have a non-zero transmitted power and wherein an average dissipated power of one set is at least ten times that of another set. Optionally or alternatively, a set or sets for which power is transmitted cover at least 5% of working frequencies. Optionally or alternatively, a set or sets for which power is transmitted cover at least 20% of working frequencies. Optionally or alternatively, at least two of said sets each correspond to a dissipation ratio range of values of at least 10%.

In an exemplary embodiment of the invention, said load comprises food. Optionally or alternatively, said load comprises a combination of at least two food portions. Optionally or alternatively, said applying causes a phase change in said load. Optionally or alternatively, said applying causes a thawing of at least a part of said load.

In an exemplary embodiment of the invention, the method comprises repeating (b) and (c) at least twice as part of a heating process.

There is also provided in accordance with an exemplary embodiment of the invention, a method of heating a load using RF, comprising:

(a) providing a load having a different rate of heating per power applied (h/p) at different portions;

(b) setting frequency/power pairs such that in heating the load less power per unit volume of portions is transmitted at frequencies that correspond to portions with a high h/p rate than at frequencies corresponding to portions with a low h/p; and (c) applying said frequency power pairs to heat said load.

There is also provided in accordance with an exemplary embodiment of the invention, apparatus configured to carryout the selecting and applying of any of the preceding claims. Optionally, the apparatus comprises a memory having a plurality of power application protocols stored therein and configured to apply different protocols to different sets of frequencies.

There is also provided in accordance with an exemplary embodiment of the invention, a method of heating a load in using RF, comprising:

(a) providing a load having an overheating temperature point;

(b) selecting a maximum power to be dissipated in the load in a manner which avoids overheating; and (c) applying RF power to said load at a plurality of different frequencies, said power being different at different frequencies and below said maximum power at all frequencies. Optionally, applying RF power comprises causing a phase change in said load. Optionally, said phase change comprises thawing. Optionally or alternatively, said phase change comprises evaporation.

In an exemplary embodiment of the invention, said phase change comprises a ratio of at least 1:20 between the effectiveness of power to cause phase change in a load portion unit and the effectiveness of the power to increase the temperature of a load portion unit that has phase-changed by 1 degree Celsius.

In an exemplary embodiment of the invention, said power is selected and applied in a manner which avoids thermal runaway in said load during said applying. Optionally or alternatively, selecting a maximum power comprises selecting a maximum power as a function of an average dissipation of the load. Optionally or alternatively, selecting a maximum power comprises selecting a maximum power as a function of spectral information of the load. Optionally or alternatively, selecting a maximum power comprises selecting a maximum power as a function of the maximal power that may be transmitted by the device into the cavity at any given frequency.

In an exemplary embodiment of the invention, the method comprises selecting a minimum power to apply at frequencies where power is applied. Optionally or alternatively, the method comprises selecting a power for each of said plurality of frequencies. Optionally, selecting a power comprises selecting one or more sub-bands of frequencies to power, within a wider bandwidth of a system used for applying said RF power.

In an exemplary embodiment of the invention, the method comprises retrieving spectral information of said load and using said information to guide at least one of said selecting and said applying. Optionally, said retrieving of spectral information is performed repetitively.

In an exemplary embodiment of the invention, applying said RF power comprises applying power at a frequency with an inverse relation to a dissipation at said frequency.

In an exemplary embodiment of the invention, the method comprises avoiding applying power at frequencies with a dissipation ratio below a low threshold level.

In an exemplary embodiment of the invention, the method comprises avoiding applying power at frequencies with a dissipation ratio above a high threshold level.

In an exemplary embodiment of the invention, said applying is responsive to identifying ice in said load and wherein said identifying comprises identifying according to frequencies with low dissipation. Optionally, identifying is compensated for the mass of the load. Optionally or alternatively, identifying is according to a threshold which is dependent on the load type.

In an exemplary embodiment of the invention, said applying comprises normalization of dissipation ratio values.

In an exemplary embodiment of the invention, applying power comprises applying different aggregate amounts of power, for a given time period, such that an actual power for a certain frequency is fixed, but a duration of application of the power within a time period is varied between frequencies, yielding a different effective aggregate power for different frequencies.

In an exemplary embodiment of the invention, applying power comprises grouping a plurality of said frequencies into a plurality of sets and varying the amount of power applied on the basis of applied power per set.

BRIEF DESCRIPTION OF THE DRAWINGS

Exemplary non-limiting embodiments of the invention are described below with reference to the attached figures. The drawings are illustrative and generally not to an exact scale. The same or similar elements on different figures are referenced using the same reference numbers.

DETAILED DESCRIPTION OF EXEMPLARY EMBODIMENTS

Overview

The present application describes, inter alia, a number of advances in the field of RF heating (e.g. microwave or UHF) heating. While, for convenience these advances are described together in the context of various apparatus and methods, each of the advances is generally independent and can be practiced with prior art apparatus or method (as applicable) or with a non-optimal version of the other advances described herein. Furthermore, advances described in the context of one embodiment of the invention can be utilized in other embodiments and should be considered as being incorporated as optional features in the descriptions of other embodiments, to the extent possible. The embodiments are presented in somewhat simplified form to emphasize certain inventive elements. Furthermore, it is noted that some features that are common to some or all embodiments of the invention may be described in the section entitled "Summary of the Invention" and should also be considered as being part of the detailed description of the various embodiments.

A method and device for providing essentially equal dissipation of energy in a general irregular load follows PCT publication WO07/096878 to Ben-Shmuel and Bilchinsky ('878) incorporated herein by reference. In an exemplary embodiment, a device according to '878 uses information that is obtained by transmitting a plurality of RF frequencies (all within a band of frequencies) into a cavity to obtain the full S-parameters of the cavity within that band, thereby being able to determine the spectral information of the cavity (e.g., dissipation of energy into the cavity) as a function of frequency. This information is used to deduce at which power (if any) each of the swept frequencies should be transmitted into the device in order to obtain a desired dissipation pattern within the cavity.

In one option, the power is transmitted only in bands that primarily dissipate in the load (and not surface currents or between antennas). This can be performed for example such that the product of the efficiency η and the power fed is substantially constant for all transmitted frequencies, and it allows an essentially equal dissipation (as a function of frequency) of energy in the load or the cavity, regardless of the load's composition.

During thawing of an object, ice in the object melts to water. Ice and water have different absorption for RF energy, resulting in a different return loss and coupling as a function of frequency. This may change matching, and after re-matching by adjustment of the matching elements, the frequency of the absorption efficiency peak may change. Optionally, by monitoring the frequency that is chosen for input (based on the acquired information) and especially its rate of change, the point at which all of the ice has melted to water can be determined and heating terminated (if only thawing is desired).

Exemplary System

Figure 1:
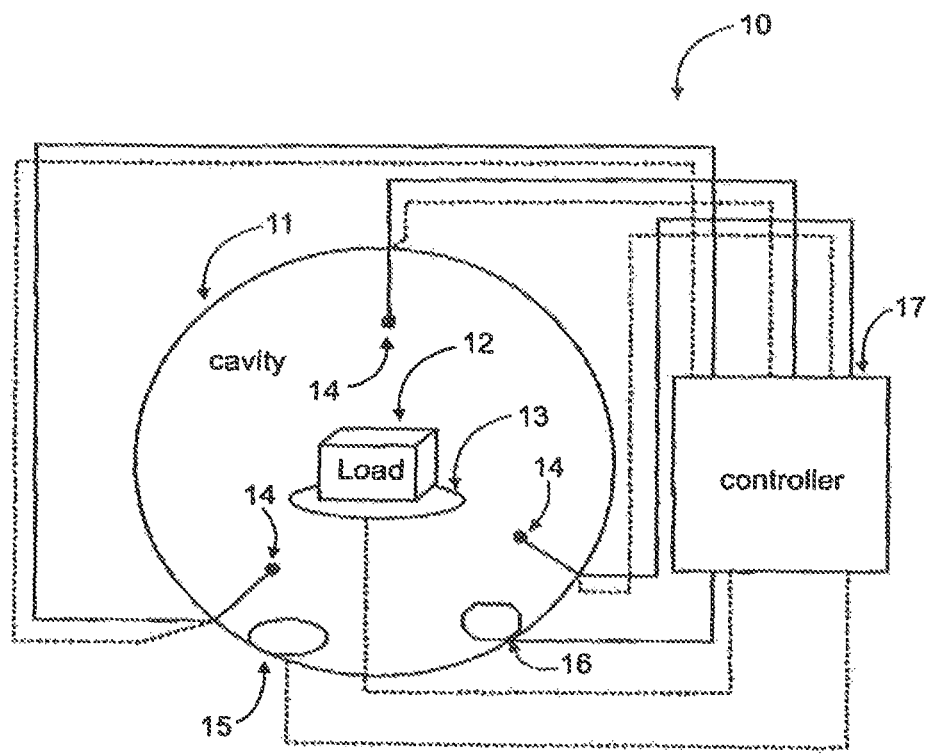
FIG. 1 schematically depicts a device in accordance with an exemplary embodiment of the present invention.

FIG. 1 schematically depicts a device 10 according to an embodiment of the present invention. In an exemplary embodiment of the invention, the device is constructed and operated as described in WO07/096878, with one or more of the changes detailed below. In particular, in an exemplary embodiment of the invention, the controller is configured such that power transmission is avoided to high absorption portions (for example corresponding to thawed portions or more polar portions or portions having a lower fat or higher water or salt content) so that danger of overheating is reduced. Additionally or alternatively, a, for example, significantly lower power is provided to defrosted portions, as power needed for temperature change and thawing in unthawed areas is much higher than needed for heating of fluid parts, so providing a similar power level would cause runaway heating of thawed portions and only mild heading/thawing of unthawed portions.

Device 10, as shown, comprises a cavity 11. Cavity 11 as shown is a cylindrical cavity made of a conductor, for example a metal such as aluminum. However, it should be understood that the general methodology of the invention is not limited to any particular resonator cavity shape. Cavity 11, or any other cavity made of a conductor, operates as a resonator for electromagnetic waves having frequencies that are above a cutoff frequency (e.g. 500 MHz) which may depend, among other things, on the geometry of the cavity. For example—a broad band of RF frequencies may be used, for example 800-1000 MHz. Methods of determining a cutoff frequency based on geometry are well known in the art, and may be used.

A load 12 is placed within the cavity, optionally on a supporting member 13 (e.g. a conventional microwave oven plate). In an exemplary embodiment of the invention, cavity 11 comprises one or more feeds 14 (e.g. antennas) which may be used for transmitting RF energy into the cavity. The energy is transmitted using any method and means known in that art, including, for example, use of a solid state amplifier. One or more, and at times all, of the feeds 14 can also be used one or more times during the heating process for obtaining the spectral information of the cavity within a given band of RF frequencies to determine the spectral information of the cavity (e.g., dissipation of energy into the cavity) as a function of frequency in the working band. This information is collected and processed by controller 17, as will be detailed below.

In an exemplary embodiment of the invention, cavity 11 also comprises one or more sensors 15. These sensors may provide additional information to controller 17, including, for example, temperature (e.g., by one or more IR sensors, optic fibers or electrical sensors), humidity, weight, etc. Another option is use of one or more internal sensors embedded in or attached to the load (e.g. an optic fiber or a TTT as disclosed in WO07/096878).

Alternatively or additionally, cavity 11 may comprise one or more field adjusting elements (FAE) 16. An FAE is any element within the cavity that may affect its spectral information or the spectral information derivable there from. Accordingly, an FAE 16 may be for example, any object within cavity 11, including one or more of metal components within the cavity, feed 14, supporting member 13 and even load 12. The position, orientation, shape and/or temperature of FAE 16 are optionally controlled by controller 17. In some embodiments of the invention, controller 17 is configured to perform several consecutive sweeps. Each sweep is performed with a different FAE property (e.g., changing the position or orientation of one or more FAE) such that a different spectral information may be deduced. Controller 17 may then select the FAE property based on the obtained spectral information. Such sweeps may be performed before transmitting RF energy into the cavity, and the sweep may be performed several times during the operation of device 10 in order to adjust the transmitted powers and frequencies (and at times also the FAE property) to changes that occur in the cavity during operation.

In an exemplary embodiment of the invention, the FAEs are controlled and/or load rotated or moved, so that a most useful spectral information is acquired for selective irradiation and/or for setting of radiation parameters such as hpl, for example as described below. Optionally or alternatively, the load and/or FAEs are periodically manipulated and/or based on a quality or other property of acquired spectral information. Optionally, the setting are selected which allow a highest hpl to be selected.

An exemplary transfer of information to the controller is depicted by dotted lines. Plain lines depict the control exerted by controller 17 (e.g., the power and frequencies to be transmitted by an feed 14 and/or dictating the property of FAE 16). The information/control may be transmitted by any means known in the art, including wired and wireless communication.

Exemplary Thawing

Figure 2:
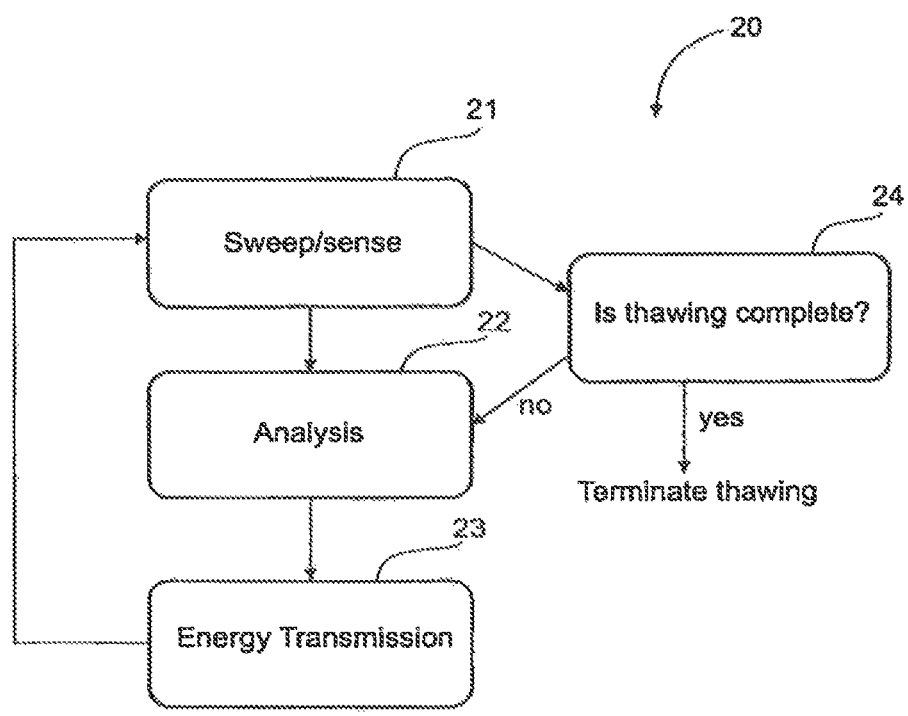
FIG. 2 is a simplified flow chart of a method of operation of a thawing device in accordance with an embodiment of the invention.

Attention is drawn to FIG. 2, which depicts a flowchart 20 showing how the device 10 may be operated to thaw a frozen load (e.g. food) according to an exemplary embodiment of the invention.

After load 12 is placed in cavity 11, a sweep 21 is performed. Sweep 21 may comprise one or more sweeps, allowing the obtaining of an average of several sweeps, thereby obtaining a more exact result. Additionally or alternatively, sweep 21 may be repeated with different FAE properties or different load/plate positions (optionally the sweep is performed several times at each configuration) and/or using different antennas for transmitting/sensing.

In order to improve the accuracy of the analysis of the sweep results, in an exemplary embodiment, the amount of power that is actually transmitted (e.g. if the power transmitted at different frequencies is not identical) at each frequency is included in the calculation, in order to deduce the percent of transmitted energy that is dissipated in the cavity. Such differences in power transmission between frequencies may, for example, be an inherent feature of the device and/or a device component, such as the amplifier.

Once one or more sweep results are obtained, an analysis 22 is performed. In analysis 22 a thawing algorithm is used to define the transmission frequencies and the amount of energy to be transmitted at each frequency based on the spectral information that was obtained at sweep 21 (optionally in conjunction with other input methods, such as a machine readable tag, sensor readings and/or the user interface). Consequently, energy 23 is transmitted into the cavity, optionally as dictated by analysis 22. Optionally, the desired dissipated power is below the expected power which is below the maximum power multiplied by the dissipation ratio.

In an exemplary embodiment of the invention, the load is scanned 120 times in a minute. Higher (e.g. 200/min, 300/min) or lower (e.g., 100/min, 20/min, 2/min, 10/thawing time, 3/thawing time) rates may be used, as well as uneven sampling rates. At times, a scan sequence (e.g., one or more scans) may be performed once every 0.5 seconds or once every 5 seconds or at any other rate, such as higher, lower or intermediate. Moreover, the period between scans may be defined by the amount of energy to be transmitted into the cavity and/or the amount of energy to be dissipated into the load. For example, after a given amount of energy (e.g. 10 kJ or less or 1 kJ or less or several hundreds of joules or even 100 J or less were transmitted or dissipated into the load or into a given portion of a load (e.g. by weight such as 100 g or by percentage, such as 50% of load)), a new scan is performed. In some cases, the information is provided using other means, such as an RF/bar-code readable tag (e.g., with previous scanning information or thawing presets) or using temperature sensors.

In an exemplary embodiment of the invention, the rate of sweeping depends on the rate of change in spectral information between sweeps, for example, a threshold of change in dissipation and/or frequencies (e.g., a 10% change in sum integral) may be provided or different change rates associated with different sweep rates, for example using a table. In another example, what is determined is the rate of change between sweeps (e.g., if the average change between sweeps was less than the change between the last two sweeps). Such changes may be used to adjust the period between scans once or more than once during heating. Optionally or alternatively, changes in the system (e.g. movement of the plate) may affect the sweep rate (typically major changes increase the rate and minor or no changes decrease it).

This process is optionally repeated for a predetermined period of time or until termination by a user. Alternatively, the thawing process may be terminated automatically 24. At 24, which may be performed after each sweep, before each energy transmission and/or at any other stage of the process, sweep results and/or a sensor reading are used to decide whether or not thawing may be or should be stopped. For example—if a phase change completion is detected or if the object's temperature is measured to be above a given temperature (e.g. outer temperature 5° C. or more), thawing may be terminated. In another example, if the total energy dissipated into the load reaches a predetermined amount of energy that is needed for thawing to a desired final temperature (e.g. taking into account the load's initial temperature and composition). Thawing may be stopped. A modification of the flowchart may be used for any other heating process, including for example heating (with or without temperature elevation) and drying. In such cases, the termination point may be defined also by other parameters, including a measured temperature, a desired total amount of dissipated energy in the load, the level of humidity, rate of temperature change, etc.

The (frequency/energy) or (frequency/power) pairs for thawing are optionally selected to increase (or even maximize) energy dissipation in frequencies that have low dissipation ratios in the load (e.g. predominantly solid or ice portions) and reduce (or even minimize) energy dissipation at frequencies that have a relatively high dissipation ratio (e.g. predominantly thawed portion, such as liquid or water). For example, in low dissipation ratios, the device will be set to produce efficient power dissipation (e.g., as a factor of the possible maximal dissipation possible) while at the high dissipation ratios, the device will be set to dissipate much less energy than may be dissipated. At times, such as when the time for transmitting each frequency is fixed, the (frequency/energy) pairs may be (frequency/actual power) pairs. As used herein, power is not necessarily a direct function of time, but may be an indirect function of time. For example, if, within a given time period, such as a minute a fixed power is used, but the duration of application of power is changed (e.g., from 1 to 2 seconds), then the net result is a difference in energy applied per the certain time unit, which is power. Thus, frequency/power pairs can include frequency/energy pairs with an application protocol. It should also be noted that one a protocol is decided for a set of dr values, this may be implemented by providing frequency/power settings, which can vary over time for a same frequency, over time. Further, as described below, a frequency/power pair may be associated directly with a set of frequencies, with the actual assignment of power to a frequency decided as part of the application protocol.

An exemplary thawing algorithm transmits zero power (or energy) at frequencies with dissipation ratio above a predetermined threshold (e.g. 70% dissipation or 70% normalized dissipation, as explained below)) of the maximum dissipation ratio in the selected working frequency range [$f_1$, $f_2$] and non-zero powers at other frequencies of that range. In some cases, the powers are selected in a binary fashion—either maximal or minimal. In some cases, the different amounts of power (relative to other frequencies, or absolute) are transmitted by allowing a different transmission time for different frequencies in a cycle. Alternatively, intermediate power levels (or energy amounts) are provided, for example for portions with intermediate dissipation levels.

In an exemplary embodiment of the invention, when power is provided to a frequency or frequency set this power level is selected to be significant. For example, such significance can be measured as a function of the total power provide din a scanning/transmission cycle (e.g., 5%, 10%, 20% or smaller or larger or intermediate values). Optionally or alternatively, this significance can be measured as an effect on temperature of a portion of at least 5% of the load in a cycle, for example, being at least 0.1° C., 0.2° C., 0.5° C. or smaller or intermediate or higher temperature changes. Optionally or alternatively, significance can be measured based on the a mount of phase changed caused by the power dissipated, for example, being enough to change a spectral image (RMSE) by at least 1%, 3%, 5%, 10% or smaller or intermediate or larger amounts in a cycle or over a period of time such as 30 seconds.

In an exemplary embodiment of the invention, the device includes a memory having stored thereon a plurality of threshold values, hpl values, dissipation/power ratios, dissipation/energy ratios and/or parameters for various load properties. Optionally, the device and/or the user select between such stored options as an initial setting or as a final setting for thawing. For example, a fixed hpl of 80% (of the maximal power of the amplifier at each frequency) may be used for frozen bovine meat of a certain weight.

Exemplary Thawing Algorithm

An exemplary thawing algorithm is the following. In a selected working range [$f_1$, $f_2$], high and low boundary powers (hpl, lpl) are selected and any applied power is maintained between these boundaries.

The boundary low power level (lpl) is the minimum power level where dissipation in the load is high enough to be useful. For example, if 15% is selected to be the minimal useful dissipation, lpl will be set for each frequency to be 15% of the maximal power that may be transmitted. Alternatively it may be set at a pre-selected low power for all frequencies (e.g., 60 Watts or less) or any combination of the aforementioned; if the dissipation in the load at a given frequency is below lpl, the transmitted power at that frequency will be set at zero.

The boundary high power level (hpl), determines the highest allowed dissipated power. This means that the highest power outputted is constrained to avoid undesired thermal effects. In addition, the actual power outputted at a given frequency may be selected according to spectral information, in particular, to selectively target unthawed areas. Optionally, the power levels are generally inversely related to dissipation. As may be noted, reducing maximum oven power will generally lengthen thawing times. In some cases, the power levels applied meet a binary criterion: hpl for low dissipating portions and some other value (such as zero) for high dissipating areas.

Using an excessively high hpl may cause an unacceptable uneven temperature distribution in the load and may result in thermal runaways. The more sensitive a load is to transmitted power (e.g., at a certain working band), the lower would be the power of an acceptable hpl. Optionally, the working band is selected according to which working band better distinguishes water from ice.

Generally, for sensitive loads, a low hpl is set, but such hpl may be used also for less sensitive loads, albeit at the cost of increasing the thawing time. Nonetheless, at times it may be preferred to set for each load the highest hpl that would provide an acceptable post thaw temperature distribution in the load (e.g. ±15° C., ±10° C., ±5° C., ±2° C. or even more uniform). The acceptable post thaw temperature distribution can depend, for example, on one or more of the composition of the load, its sensitivity to overheating (e.g. whether damage is caused; its extent and reversibility; and to what extent the damage is material) and the purpose for which the load is intended. It is noted that at times, speed of thawing is preferred over quality, in which case a higher hpl may be used, and the post thaw quality would be suboptimal. Optionally, the device is provided with a user selectable tradeoff (e.g., knob or data input) between uniformity, maximum temperature and/or rate of thawing.

It is noted that in accordance with some embodiments of the invention, prevention of hot spots is actively preferred over uniformity of thawing, heating and/or energy dissipation.

Optionally, hpl is set low enough so that a thawed section will not be over heated before heating at its respective frequencies is stopped or reduced.

Exemplary Methods of Determining Hpl (High Power Level)

hpl may be determined in various manners, for example, by trial and error. In an exemplary embodiment of the invention, several hpl settings are tried to determine the maximal hpl which would provide an acceptable temperature distribution in the load, post thawing. Such trials may continue during thawing, for example, being performed every scan, every second or every minute or at intermediate time scales. In an exemplary embodiment of the invention, hpl is started at low values and increased gradually. Optionally, the hpl is set per item type.

In an exemplary embodiment of the invention, preset hpl values are provided for various combinations of load properties, such as ore or two or more of shape, weight, temperature, desired effect and/or material type. Optionally, a user can select such properties and the device will suggest and/or use an hpl accordingly.

Optionally, hpl is updated periodically during thawing.

In an exemplary embodiment of the invention, hpl is estimated (initially or in an ongoing manner) with the assistance of changing the load and/or cavity so that more useful spectral information is acquired. In general, if the acquired spectral information is better, a better cut-off between ice and water may be identified, allowing a higher hpl to be used for the ice sections and allowing a faster heating at a same quality (e.g., evenness) and/or a higher quality heating at same speed.

Alternatively, and while not wishing to be bound by theory, it is proposed that the sensitivity of the load may be determined based on the relative dissipation of energy in thawed and frozen portions of the load. When the dissipation in frozen portion and thawed portion is relatively similar (e.g. 10-15% dissipation difference, such as between 40% and 50% dissipation ratio) (e.g. due to low water content), the sample is deemed to be of high sensitivity (e.g., the distinction between ice and water requires a more sensitive determination). The greater the disparity is between dissipations in thawed and frozen parts, the lower the sensitivity of the load. Therefore, hpl may be determined by obtaining the spectral information of the load and comparing the maximal dissipation ($d_{max}$) with the minimal dissipation ($d_{min}$) in a working frequency band. The greater the difference is between $d_{min}$ and $d_{max}$ the lesser the sensitivity of the load, and higher the hpl that should optionally be used.

It is noted that the hpl may be allowed to be higher if a better selection of power to intermediate dissipation frequencies is provided.

Also alternatively, and while not wishing to be bound by theory, it is proposed that hpl may be determined based on the maximum power that can be dissipated in the load at each frequency (ep(f)) and ldl. hpl may be set to be such that the portion of the frequencies being used, for example all frequencies within a working band (e.g. the band spanning 800-1000 MHz)) (or other set of frequencies) that are considered to dissipate into the load and for which lpl<ep (f)<hpl would be less than a preset threshold. For example, this threshold may be selected to be 10% or 20% or 30% or any value in-between. Optionally, this method is based on a realization (and/or for cases that) that the device is typically limited in maximum power and that practically, the closer the hpl is to the maximum power, the less easy it may be to provide different power levels at different, near, frequencies. Optionally, the percentage depends on a desired tradeoff between quality and and/or speed.

Accordingly, a thawing protocol may use a single hpl value (e.g. if dedicated to loads having similar sensitivity; or a low hpl that would be suitable for most contemplated loads). Alternatively, the protocol may use a selection between several possible hpl values (e.g. a selection between a number of preset values or optionally setting the value manually or automatically to correspond to a given load and/or acceptable post thaw temperature distribution). Finally, the protocol may use any value (e.g. calculated automatically or selected manually) within the power capabilities of the device. An example of a relatively high hpl may be 300 Watt or 80% of the maximal power from the amplifier at that frequency. An example of a relatively low hpl may be 120 Watts or 30% of the maximal power from the amplifier at that frequency. Interim values are possible as well.

Exemplary Determination of Dissipation Function Dr(f)

dr(f) denotes the dissipation ratio as a function of frequency, namely the percentage of transmitted power through each feed (e.g. feed j) that is dissipated in the load. This function has potential values between 0 and 1, and is optionally computed as shown in Equation 1, based on the measured power and using measured spectral information. However, as noted herein, a binary function or non-linear and/or non-monotonic function may be used (e.g., and determined in a factory or during calibration).

$$dr_j(f) = \frac{P^j_{incident,watt}(f) - \sum_i P^i_{returned,watt}(f)}{P^j_{incident,watt}(f)} = 1 - \frac{\sum_i P^i_{returned,watt}(f)}{P^j_{incident,watt}(f)} \quad (eq. 1)$$

Normalization of Dr(f)

The dissipation ratio in frozen portions (e.g. ice) is relatively lower than that of the thawed portions (e.g. liquid/water), but a large amount of ice can show considerable dissipation. In order to distinguish dissipation in at frequencies having a low dissipation ratio (e.g. ice) from dissipation at frequencies having a high dissipation ratio (e.g. liquid water), while reducing the effect of relative mass, the dr(f) function is optionally normalized to the whole range between 0 and 1; This normalization may be useful also in other cases where the difference between dissipation in frozen portions and thawed portions is relatively small, regardless of the cause (e.g., low water content). The normalized function—dr'(f)—may be used to calculate the compensation factors, as shown below.

$drh = \min\{dr(f)\}_{f \in [f_1, f_2]}$ $drl = \max\{dr(f)\}_{f \in [f_1, f_2]}$ $$dr'(f) = (dr(f) - drl)/(drh - drl) \quad (eq. 2)$$

In case of some loads the use of dr'(f) is optionally avoided, and in original dr(f) used instead. Optionally, a device is configured to have both protocols for alternative use. The choice between the protocols may be based on user input (e.g. user interface or machine readable tags) or on a sensor reading within the device (e.g. a weight sensor). Alternatively, dr'(f) may be used for all loads.

The maximum power that can be dissipated in the load at each frequency (depicted as ep(f)) is optionally calculated as follows, given that $P_{maximum\ j,\ watt}$ is a maximum power available from the amplifier at each frequency.

$$ep_j(f) = dr_j(f) P_{maximum,j,watt}(f) \quad (eq. 3)$$

Using the above, the compensation function (coeff(f)) is optionally calculated. This function is optionally used to determine the relative amount of energy that should dissipate in the load at each frequency, as a function of dr'(f), for example as shown in eq. 4A:

$$coeff(f) = F(dr'(f)) \quad (eq. 4)$$

$$F(dr(f)') = \begin{cases} dr' < 3 & 0 \\ dr' > 0.8 & 1 \\ \text{Else} & -2dr' + 1.6 \end{cases} \quad (eq. 4A)$$

In an exemplary embodiment of the invention, frequencies may be classified as "ice", "water" and/or "mixed ice/water" according to their dissipation ratio. Optionally, higher power is provided into ice and mixed ice/water and plain water is provided with low or no power.

Optionally, there is provided a dissipation threshold below which the dissipation into the load is so low that no power is transmitted, as the load portion is assumed to not be ice. In an exemplary embodiment of the invention, the device is designed to have a very low intrinsic dissipation at any frequencies or a known dissipation at only some frequencies (where the threshold may then be raised).

It is noted that large pieces of ice may have a relatively high dissipation. Optionally, if there are no (or few, e.g., below a threshold) low-dissipation frequencies and it is known that the load is frozen, then it is assumed that the lowest dissipation frequencies are ice and power (at regular or somewhat reduced levels) is provided at such frequencies, until lower dissipation frequencies appear, indicating the formation of smaller frozen regions.

Example Dr(f)

Figure 3:
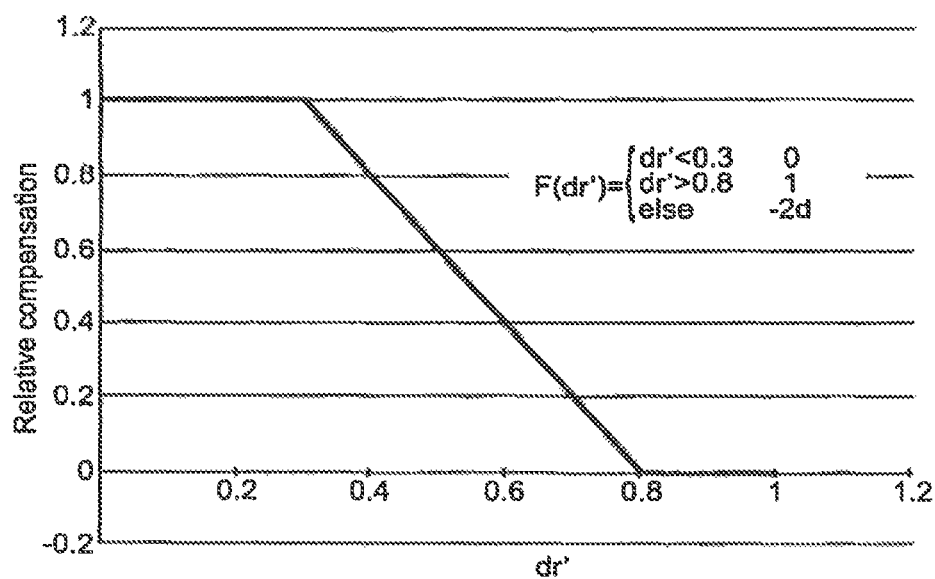
FIG. 3 is a graph of relative compensation vs. normalized dissipation ratio for an exemplary decision function.

An example for a function according to Equation (4) is depicted in FIG. 3. As can be seen, two limits are set. At frequencies that dissipate into the load less than a pre-set threshold (e.g. dr'(f)<0.3 in the example of FIG. 3) the maximal allowed power which is a minimum between the ep(f)/dr(f) and hpl(f)/dr(f) will be transmitted. At frequencies that will at dissipate into the load more than a pre-set value (e.g. dr'(>0.8 in the example of FIG. 3) no energy will be transmitted. At all other frequencies (0.3<dr'(f)>0.8 in the example of FIG. 3) the power transmission will be calculated using the selected function. In the case of FIG. 3 this was a generally linear function, but other functions, optionally non-linear, may be used that provide an inverse correlation between dr'(f) and coeff(f) (e.g. exponential, step function, piecewise linear, polynomial and/or general look-up table, optionally with interpolation). Optionally, the function prefers applying power to low-dissipation areas to an extent greater than a simple inverse function. Optionally, the function is selected based on a perceived risk of damage to the load.

Exemplary Actual Power Calculation gl(f) is the power to be dissipated in the object to be heated, taking into consideration the maximum power that can be dissipated in the load at each frequency (ep(f)) and hpl(f) and the compensation function (coeff(f)), as follows:

$$gl(f) = \begin{cases} hpl < ep(f) & hpl \cdot coeff(f) \\ lpl < ep(f) < hpl & ep(f) \cdot coeff(f) \\ else & 0 \end{cases} \quad (eq. 5)$$

Using gl(f) the power to be transmitted from the amplifier (nopw(f)) in order to cause the desired dissipation in the load, at each frequency, is optionally calculated as follows:

$$nopw(f) = gl(f)/dr(f) \quad (eq. 6)$$

nopw(f) will always be lower than $P_{maximum,j,watt(f)}$, which is the maximum power extractable from an amplifier at each frequency for the following reason:

$$gl(f) = \begin{cases} hpl < ep(f) & hpl \cdot coeff(f) \\ lpl < ep(f) < hpl & ep(f) \cdot coeff(f) \\ else & 0 \end{cases} \quad (eq. 7)$$

$$\max\{gl(f)\} = ep(f)coeff(f) = dr(f)P_{maximum,j,watt}coeff(f)$$

$$\max\{nopw(f)\} = \max\{gl(f)\}/dr(f) = P_{maximum,j,watt}coeff(f)$$

Calculation of Hpl Using Average Dissipation

Figure 5:
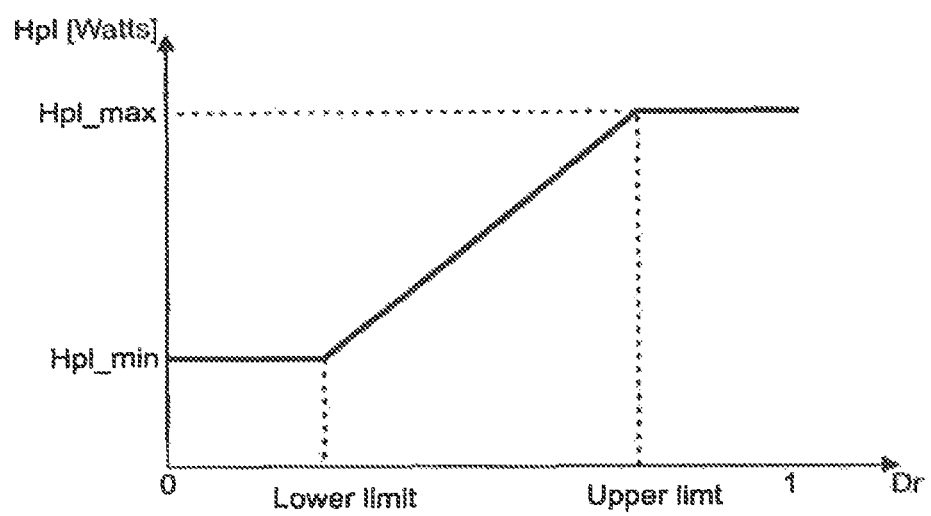
FIG. 5 is a chart illustrating a method of selecting an hpl parameter value as a function of average dissipation.

FIG. 5 shows hpl being calculated as a function of the average dissipation ratio within the working band or within the selected frequencies. Optionally, this is based on the assumption that a low average dissipation means a high sensitivity and vice versa. Other functions may be used as well, for example, a table matching hpl to average dissipation.

As seen in the graph, a low average dissipation ratio indicates a high sensitivity of the load and accordingly dictates a low hpl. The low value of hpl is optionally selected to be slightly above lpl (to provide a minimal working range). For example, the minimal hpl value may be between 70 and 120 Watts (e.g. 80 Watts). The maximal level of hpl may be chosen to be as high as the maximal possible amplifier power or slightly below that. As seen in FIG. 5, when the average dissipation ratio is below a preset lower limit, hpl is selected to be the lowest hpl allowed, and when the average dissipation ratio is above a preset upper limit, hpl is selected to be the highest hpl allowed. The lower limit for average dissipation ratio may be, for example, between 0.1 and 0.3 (e.g. 0.2) while the upper limit may be for example between 0.5 and 0.9 (e.g. 0.6).

In-between values of average dissipation optionally dictate an intermediate hpl value. It is to be appreciated that while FIG. 5 depicts a generally linear correlation for the intermediate average dissipation ratio values, other functions, optionally non-linear, may be used that provide a positive correlation between the average dissipation ratio and hpl (e.g. exponential, step function, polynomial, step-wise linear).

In some cases, the frequency distribution is in frequency bands, so that one band can be recognized as matching ice (e.g., low dissipation) and another matches water (e.g., high dissipation). Optionally, instead or in addition to calculating hpl, gl(f) is set to be zero or at lpl (or any other preset low value) for bands associated with water and at any preset high value (e.g. hpl or a maximum available power or other setting) for ice-associated bands. Optionally, the classification of bands as water/ice is updated optionally periodically based on spectral information that is periodically acquired.

While particular ways of calculating hpl and gl(f) are described above, the methods can be combined, for example, arithmetically or logically, for example, using an average value of several methods or using a minimum or maximum or multiple methods. For example—a Gaussian function of dr(f) (or of dr'(f)) may be used to calculate gl(f).

Exemplary Operation

Figure 4:
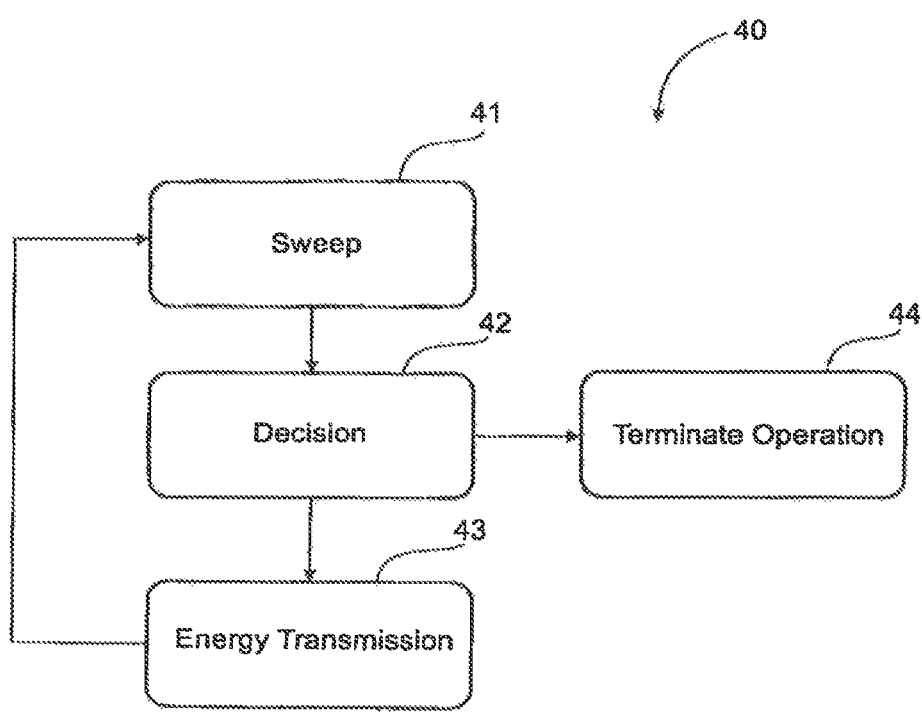
FIG. 4 is a is a simplified flow chart of a method of operation of a device in accordance with another embodiment of the invention.

Attention is now drawn to FIG. 4, which depicts a flowchart 40 showing how the device 10 may be operated according to an exemplary embodiment of the invention.

Sweep 41 is essentially the same as sweep 21 in FIG. 2. Once one or more sweep results are obtained, decision 42 is performed. At decision 42 a decision is made; namely a selection is made between two or more energy transmission protocols and (optionally) termination of the operation sequence. This decision may comprise one or more of the following decisions:

Thawing Protocol—when thawing mode is operated, decision 42 optionally comprises a selection of frequency/power or frequency/energy pairs that are expected to dissipate more energy into ice than into water (e.g. as described above). In an exemplary embodiment of the invention, thawing is detected by tracking one or more of the rate of changes in the spectral image (e.g., changes are faster as phases change); the temperature change rate (e.g., temperatures change faster as phases change) and/or the temperature (e.g. with a sensor).

Heating Protocol A—when this mode is operated, decision 42 optionally comprises a selection of frequency/power or frequency/energy pairs that are expected to dissipate a different energy pattern by one group of frequencies characterized by a given absolute or relative dr (or dr') value range than by at least one other group. In an exemplary embodiment of the invention, high power or a larger amount of energy per heating cycle is dissipated by one group of frequencies (e.g. those having a relatively high dr or dr' than those having a lower dr or dr'), while in both groups a non-zero amount of power and energy is dissipated.

Heating Protocol B—in an exemplary embodiment, decision 42 comprises a selection of frequency/power pairs that are expected to dissipate more energy into the load than elsewhere (e.g. surface currents, antenna matching, etc.). Non limiting examples for such protocols are disclosed in PCT publications WO07/096878 and WO08/007368.

Keep Warm Protocol—in an exemplary embodiment, decision 42 comprises a selection of frequency/power or frequency/energy pairs that are expected to dissipate an essentially equal amount of energy in all portions of the load in a cycle. Optionally, this heating is controlled such that the temperature of the object will not deviate significantly from a preset temperature (e.g. 35° C.±2° C. or 45° C.±2° C.). For example, this may be done using feedback from a temperature sensor or by limiting the energy allowed to dissipate at any given time. It should be noted that heating water may cause the water to boil away, thereby utilizing dissipated power for evaporation, while other portions may not have evaporation, causing heating.

Protocol Selection—in an exemplary embodiment the protocol is capable of automatically changing operation modes (e.g., terminate thawing once phase change is complete and/or begin heating at that time or select a thawing decision formula). This may depend on input from a sensor and/or from information obtained in a frequency sweep, and/or be based on instructions (e.g. the amount of energy to dissipate in the load at a given step). The decision might be to terminate operation or to change from one protocol (e.g. thawing) to another (e.g. warming).

An example for a sensor input includes the sensing of temperature. Once the temperature sensed by one or more of the sensors (or a calculated temperature, for example, an average) or the temperature at all sensors has reached a predefined temperature, the device may decide to change the heating protocol. For example, if the sensed temperature indicates that thawing is completed, the device may change the protocol to either stop heating or to begin cooking or to maintenance of the sensed temperature (e.g., to ensure full thawing and/or prevent recrystallization if a portion of the load is still frozen or to maintain a load at a serving-ready temperature).

At times, the predetermined temperature that indicates completion of thawing is slightly above the freezing point (e.g. 2-15° C.). When the sensed temperature is an external temperature of the load (e.g. by use of an IR sensor), the predetermined temperature may be at times be selected to be slightly higher than when using internal sensors (e.g. 8-10° C.), since at times, the inner temperature at the end of thawing is lower than the outer temperature (especially if the device provides a warm interior). In another alternative, if the device interior is cool, the inner temperature may be expected to exceed that of the exterior, in which case the sensor reading to indicate the termination of thawing may de lower (e.g. 4-80° C.). At times (e.g., when a plurality of internal sensors is used) a smaller temperature range might be preferred (e.g. 4° C.-6° C.).

Decision 42 may also be based on some form of user input that may be provided before or during operation. The input may be provided through one or more of a user interface, and using a machine readable tag, such as a barcode or RFID. The user input may comprise information regarding a sequence of decisions and/or the triggers thereto, such as one or more of the amount of energy to dissipate, a phase change, a temperature change and/or a temperature change rate.

Once decision 42 is concluded, an energy transmission step 43 at the selected frequency/power or frequency/energy pairs may be transmitted. Optionally, the decision was to terminate operation, in which case the device would transmit no energy to the load, and may send notice (e.g., by playing a sound, light or any form of communication) to a user. At such time the device may terminate operation automatically. This may be accompanied by notification to the user (e.g., by light, sound or message display, or by transmitting an electronic message to a remote device for example a cell phone or computer).

Energy transmission 43 may continue for a period of time (predefined or based on a sensor feedback) and terminate automatically. Optionally or alternatively, transmission 43 is followed by a repeated sweep 41, which allows adjusting the device's operation to changes that occurred during heating (e.g. phase change or new spectral information). Optionally or alternatively, operation of the device at each stage may be manually terminated by a user.

Additional Exemplary Operation

As noted above, a material may include two or more portions (e.g., 3 or more) which it may be desirable to heat by different amounts of energy per unit mass (or volume) and/or at different uniformity/efficiency ratios and/or in which different dissipation ratios are observed. Optionally or alternatively, it is possible that most or all of these portions are not frozen materials or materials that change phase during heating. For example, a portion of relatively high-fat material may be heated together with a portion of a relatively low fat material and/or a portion of relatively high-water material, or a mixture thereof.

In an exemplary embodiment of the invention, when power is applied to an object, parts of the object are classified according to their dissipation ratio and this drives the power (or energy) application protocol used for each such classified portion. It should be noted that portions may be physically separate or intermingled. In an exemplary embodiment of the invention, when power is applied to a load, the transmitted frequencies are classified according to their dissipation ratio in the load and this drives the power (or energy) application protocol used for each such classified group of frequencies. It should be noted that at times, at least two different groups of frequencies are transmitted differently, such that a significant amount of energy is dissipated by all frequencies of said at least two groups.

Figure 8:
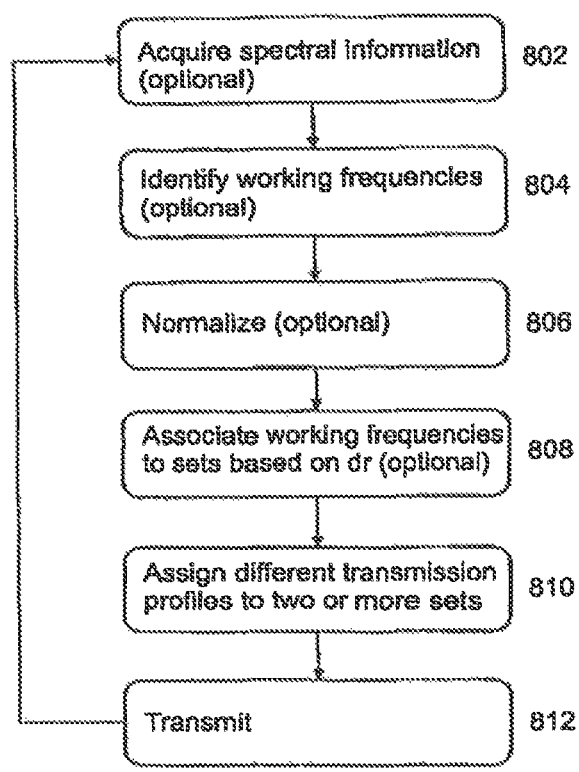
FIG. 8 is a flowchart of a method of differentially heating materials with different dissipation ratios, in accordance with an exemplary embodiment of the invention.

FIG. 8 is a flowchart of a method of differentially heating materials with frequencies having different dissipation ratios in the load, in accordance with an exemplary embodiment of the invention.

At 802, spectral information is optionally acquired. Optionally or alternatively, electro-magnetic properties of portions of an object to be heated may be input, for example, manually, using a camera or using an information-bearing tag associated with the object. Alternatively, for example for some protocols such as thawing, frequencies of water and ice may be provided ahead of time.

At 804, various "working" frequencies are optionally identified with respect to them being useful for the intended heating. Optionally or alternatively, it is determined which frequencies to use with the system, for example, based on amplifier abilities and/or other considerations, such as not operating at a high Q factor, or at excessively low dissipation ratios (e.g. 10% or less).

At 806, the dissipation ratio values are optionally normalized, for example, so that the maximal observed dissipation is given a 100% value and the minimal observed dissipation ratio is given a 0% value. Normalization is optionally linear, for example as explained in the thawing example above.

At 808, working frequencies are grouped according to their dissipation ratio (dr), or normalized dissipation ratio (dr') and/or heating rate. Optionally, the frequencies are clustered according to thresholds. Optionally, such thresholds are provided as noted above regarding information input. Optionally or alternatively, the frequencies are clustered according to their dissipation ratios. Optionally, the dissipation ratio distribution is used to identify an object and/or provide an indication of its composition and/or material phase. Optionally, additional inputs are used, such as a camera or a weight scale and/or humidity/temperature sensor and/or information provided manually or by a machined readable tag (e.g. RFID). For example, there may be 2, 3, 4, 5 or more different dissipation ratio sets identified for associating frequencies therewith. Optionally, the power at one set is at least a factor of 2, 3, 4, 7, 10, 20 or smaller or intermediate factors of a second set with non-zero transmission. In an exemplary embodiment of the invention, at least one set, or optionally all sets have a bandwidth of at least 5%, 10%, 20% or smaller or intermediate bandwidth percentages of the total working bandwidth. In an exemplary embodiment of the invention, at least one set and optionally all sets correspond to dissipation ratios of a span of at least 5%, 10%, 20% or smaller or intermediate spans of dissipation ratio values, for example, a set corresponding to a range of between 45% and 55% dissipation ratios.

In some cases there is an overlap between ranges of dissipation ratios associated with different portion types or locations. At times, a given frequency or group of frequency dissipates both in a high dissipation ratio portion(s) of a load and a low dissipation ratio portion(s) of a load, such that the frequency displays an intermediate overall dissipation ratio. In some embodiments, frequencies within such overlaps are simply not used. Optionally or alternatively, such frequencies are assigned a separate category. It should be noted that in some embodiments of the invention it is of interest to increase the amount of power (or heating) delivered to a particular portion and/or to reduce the number of frequencies used, while possibly reducing homogeneity. This need not interfere with the main goal of differently applying power or heat to different portions. This can also affect the protocols applied to different sets. For example, a protocol may be defined with respect to the amount of power provided for a set and this power level may be distributed among more or fewer frequencies, based, for example, on ease of frequency changing, reliability of the identification of the frequency in question with a particular portion. Optionally or alternatively, a single set of frequencies of a single portion may be divided up into multiple sets (and/or combined with another set) for the purpose of assigning different protocols thereto. This may be useful for providing desired homogeneity levels and/or heating velocities. Optionally or alternatively, two sets may be combined. Optionally, sets and association of frequencies thereto may change during heating. Optionally, a heating protocol of an object includes points in time to reconsider the association of frequencies into sets.

In some embodiments, the number of groups to which the sets of frequencies is fixed in advance, for example 2-10 groups or 2-4 groups of frequencies, wherein each group is used to transmit energy to the load at a different heating protocol.

At 810, different power application protocols are associated with each set. A power application protocols can include, for example, one or more of: maximum power, minimum power, power relative to other sets or to other frequencies within a set, maximum heating rate, minimum heating rate, relative heating rate (e.g., between sets or between frequencies within sets), power per set, power per each frequency within a set, power to be dissipated in the load by a given set or frequencies within a set, time profile of power application, method of non-maximal power achievement (e.g., amplification factor, duration at each frequency, number of repetitions in a set and/or combination thereof), heating homogeneity vs. velocity tradeoffs, time profile of pauses between power applications and/or cycling of power application between frequencies. A device may include a memory having stored therein multiple such protocols. It should be noted that the protocols may be markedly different, for example, one portion of the food may be thawed, while another portion is cooked or baked.

In one example, there is little or no power (or energy) transmission at higher dissipation ratios and optionally homogeneous transmission at lower dissipation ratios. Optionally, for intermediate dissipation ratios, there is a discrete decreasing function (optionally a step function at 30% or 50 dissipation ratio), for example, as described above for a thawing application.

In another example, one food portion (e.g., food which is less sensitive to overheating) is heated fast, with maximum power, possibly resulting in more in-homogeneity, while another food portion with other dissipation characteristics is heated slower and/or to a lower temperature, and optionally more uniformly.

At 812, the power application protocol is applied. The process may then be repeated. In some embodiments, acquiring spectral information and/or assigning profiles need not be applied at every transmission sweep and/or at same frequency. The rate of sweep between heating sessions may be fixed or it may change during heating, for example as described above in connection with an exemplary thawing process.

It should be noted that while the above description has describe associating frequencies into sets, this need not be actually done, rather setting thresholds for different power application protocols inherently describes such sets and allows the decision of power application protocol to be applied on a frequency by frequency basis. It should also be noted that in some cases, the determination of how much power to apply and in what protocol, is directed at sets, rather than individual frequencies, with a decision regarding frequency/power pairs being decided after allocation of power to sets is carried out.

As noted herein, when a power is associated with a frequency, this need not mean that the power at which energy is transmitted at the frequency must change. Rather, the power si an aggregate power and can be affected, for example, by a longer transmission time. Optionally, the actual transmitted power is selected according to an ability of the amplifier of the system, for example, according to a high efficiency point of the amplifier or according to a time it takes to change amplification. It is possible that actual power will depend on the maximum power at any frequency. Optionally or alternatively, a selection of frequencies to use is made depending on the available amplification, with frequencies with low amplifications optionally avoided.

Example of Multi-Food Heating Experiment

Dissipation properties of some foods and food types are known at various conditions and frequencies. See for example Bengtsson, N.E. & Risman, P.O. 1971. *"Dielectric properties of food at 3 GHz as determined by a cavity perturbation technique. II. Measurements on food materials."* J. Microwave Power 6: 107-123. Such known values (for food or any other load), or using various techniques to estimate or measure the dissipation ratio at different frequencies for a plate (or load) combination, are optionally used to provide differential heating for different objects (e.g., foodstuffs), for example as shown in the following example, which was aimed at controlling the relative heating of different loads:

Both heating processes were performed using a 900 Watt device with a working band at 800-1000 MHz, constructed and operated substantially according to an embodiment of WO07/096878 ('878);

Cooked rice and raw thigh of chicken were placed together on a conventional household plate and heated according to one of the following protocols:

Protocol 1: Heating is limited to frequencies having a relatively high dissipation ratio, but an essentially uniform energy transfer is performed in all transmitted frequencies. In this specific protocol, as ep(f) normally correlates with the dissipation ratio, transmission of a homogeneous amount of energy (or power) was performed in the 30% of the frequencies having the highest ep(f). In addition, transmission was performed in all frequencies having at least 80% of the lowest ep(f) of said 30% of the frequencies. It should be noted that also in other protocols described herein, the separation of frequencies into sets corresponding to portions may be according to percentage, rather than a threshold.

Figure 9:
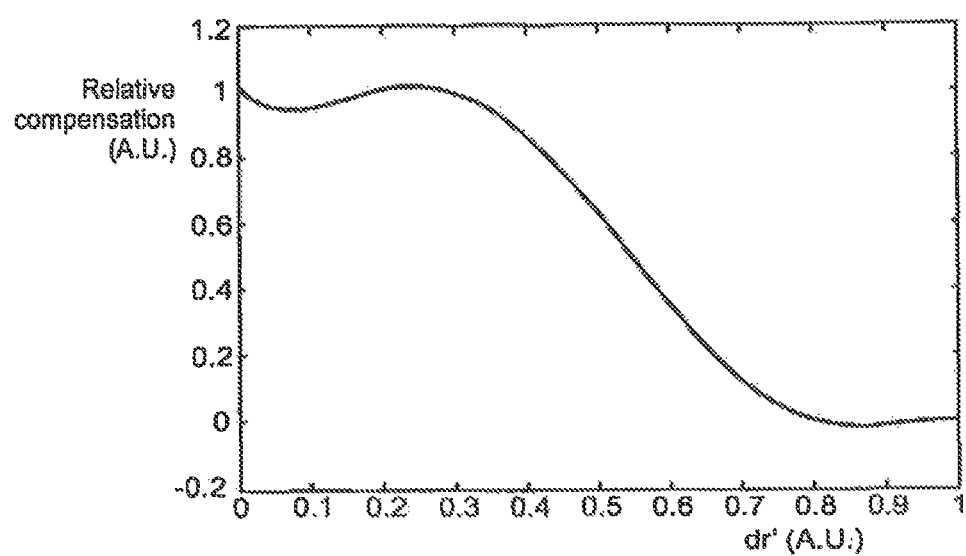
FIG. 9 shows an exemplary alternative to the example of FIG. 3.

Protocol 2: Maximal transmission is performed at frequencies having about 30% or less normalized dissipation ratio (dr') and no transmission at frequencies having 80% or more normalized dissipation ratio, with an approximately linear relation in-between. A graph showing the exact function used is attached herewith as FIG. 9.

Temperature was measured before ($T_0$) and after heating ($T_1$; $\Delta T=T_1-T_0$). In the chicken, several places were probed, and after heating some variation of temperatures was observed. In the rice, the temperature was the same wherever probed. The results are summarized in the table below:

| Protocol | Plate composition | $T_0$ (° C.) | $T_1$ (° C.) | $\Delta T$ |
|---|---|---|---|---|
| 1 | 100 g chicken | 12 | 70-77 | 58-65 |
|   | 160 g rice | 11 | 47 | 36 |
| 2 | 105 g chicken | 14 | 66-70 | 52-56 |
|   | 160 g rice | 11 | 72 | 61 |

As seen above, in Protocol 1 the chicken heated to a much higher extent than the rice, while in Protocol 2, heating was more uniform between the two foods, with the rice heating slightly more than the chicken. A similar result was obtained in repeat experiments. It should be noted that either result may be desired, depending on the circumstances (e.g., user preference).

Figure 10:
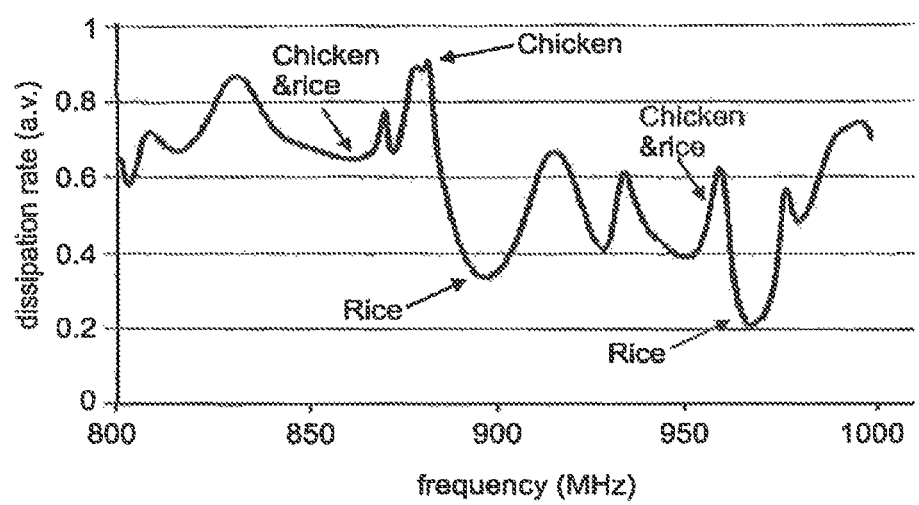
FIG. 10 shows different dissipation ratios for a mixture of rice and chicken.

FIG. 10 is a chart showing the normalized dissipation ratio measured in the device cavity for a rice & chicken plate at different frequencies in the heating experiment shown for Protocol 2 above. As heating progresses, and as the position and/or location of the load changes during heating, the measured dissipation ratios can change. Nonetheless, a first approximation is that for the higher dissipation ratio frequencies, most of the energy dissipates in the high dissipation ratio portion of the load (chicken in the instant example) and for the lower dissipation ratio frequencies, most of the energy dissipates in the low dissipation ratio portion of the load (in this example—rice).

Thus, when protocol 1 was used, heating was mainly at high dissipation ratio frequencies, thereby heating mainly the chicken; when Protocol 2 was used, heating was mainly at low dissipation ratio frequencies (but with a varying amount also in interim dissipation ratio frequencies) thereby heating the rice slightly more than the chicken.

Exemplary Variations

In an exemplary embodiment of the invention, the above methods can be used not only to avoid reaching a certain temperature, but additionally or alternatively, to minimize a time within a temperature window. For example, some temperatures may encourage bacterial growth or food degradation if maintained. For example, the above methods may be used to ensure that a lower limit of the temperature window is not reached, but is approached, by all the load and then relatively rapid heating applied until an upper limit of the temperature window is passed.

While the above have been described as methods of determining a complete irradiation profile, the above methods may also be used otherwise. For example, the above hpl calculation may be used as a limit that is applied after other irradiation profiles are selected, for example, as a safety measure to avoid runaway heating. In another example, frequency bands may be selected to have no power transmitted therein to prevent boiling of water, and this selected being applied to an otherwise determined method of frequency/power sets.

Optionally, after a portion reaches a target heat and/or is thawed, energy provision is not stopped (or, in some cases, set to lpl), but rather selected to ensure that the portion does not re-crystallize and/or stays at a desired temperature. As can be apperceived, once it is known that the portion thawed, a power level that has a desired temperature effect on that portion may be calculated form physical consideration or using a look up table.

Examples

The following non-limiting examples illustrate the application of some exemplary embodiments of the invention and should not be taken as being necessarily limiting. In the following experiments, a single frozen object at a time (as detailed below) was placed for defrosting in a cavity of an oven having three input antennas within a cylinder shaped cavity, working at 0.9 kW., and spectral information was obtained.

Figure 6:
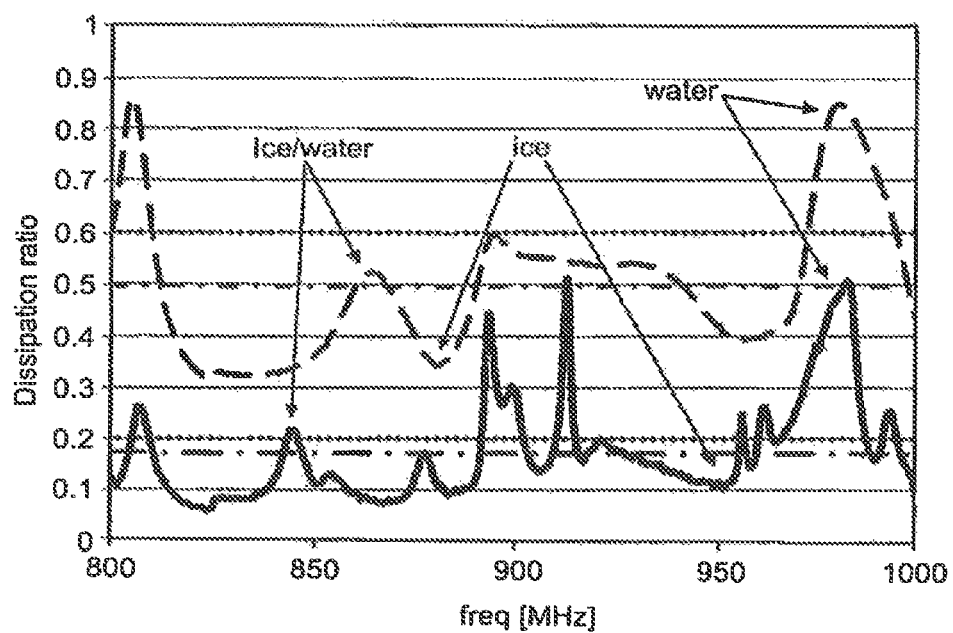
FIG. 6 is a chart showing measured dissipation ratios, in average and at various frequencies for bovine flesh and tuna fish flesh having the same mass.

FIG. 6 is a graph showing the spectral information obtained with a frozen (−20° C.) 790 gr cut of bovine sirloin (dashed line) and the spectral information obtained with a frozen (−20° C.) 790 gr portion of tuna fish (solid line). Also shown (dot-dash line) are the average dissipations calculated from the spectral information, with the average dissipation for the meat appearing at about 0.5 and the fish at about 0.17. The dotted lines depict the maximal and minimal allowed values for hpl (which is typically a function of the device and not the load). Some examples of places where the dissipation ratio indicates ice, water or ice/water are marked.

Figure 7:
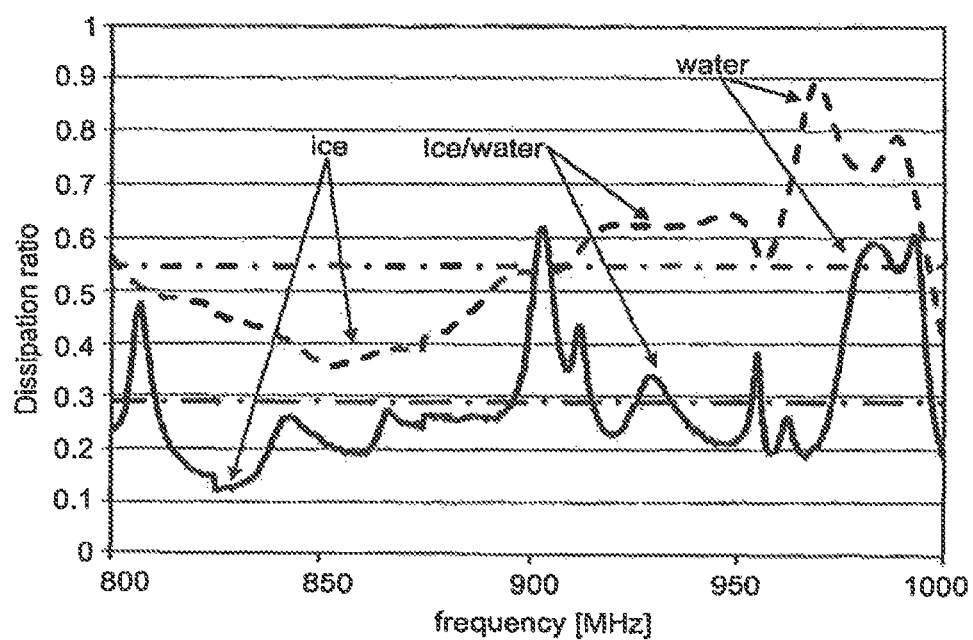
FIG. 7 is a chart showing measured dissipation ratios, in average and at various frequencies for a large chicken and for a small chicken.

FIG. 7 shows the spectral information obtained with a frozen (−20° C.) 1,250 gr chicken (dashed line) and the spectral information obtained with a frozen (−20° C.) 450 gr chicken (solid line). Also shown (dot-dash line) are the average dissipations calculated from the spectral information, with the average dissipation for the larger chicken appearing at about 0.55 and the smaller chicken at about 0.29.

As seen in the graphs, the dissipation at each frequency, as well as average dissipation, is affected inter alia by the composition of the load (e.g. meat v. fish, with different fat/protein/water ratios) and its size (with a larger chicken having more liquid water to absorb RF energy at frequencies where absorption is relatively low).

General

Following is a list of applications and publications describing RF ovens and methods which may be used with the methods and apparatus described herein:

| Title | Country | Ser. No. |
|---|---|---|
| DRYING APPARATUS AND METHODS AND ACCESSORIES FOR USE THEREWITH | PCT | IL2008/000231 |
| ELECTROMAGNETIC HEATING | PCT | IL2007/000235 |
| FOOD PREPARATION | PCT | IL2007/000864 |
| RF CONTROLLED FREEZING | PCT | IL2007/001073 |
| A METHOD AND A SYSTEM FOR A MODULAR DEVICE | USA | 61/064,201 |
| DYNAMIC IMPEDANCE MATCHING IN RF RESONATOR CAVITY | USA | 12/230,431 |
| ELECTROMAGNETIC HEATING | USA | 12/153,592 |

In the above description, different frequencies were described as having different power transmitted there. Such power differentiation can be of several types, including one or more of: different peak power, different duty cycle and/or different rate (e.g., power is supplied at fix amplitudes, but at different rate and/or delays between pulses for different frequencies) and/or at different efficiencies (e.g., transmitted in a configuration where more power is reflected back to the feed. In another example, power is provided in sweeps and for each sweep power is provided at a frequency or not, depending on the total power to be delivered at that frequency. In another example, power is provided as multi-frequency pulses, with each pulse including power in a plurality of frequencies; the frequencies in each pulse and/or amplitude of the power for a frequency in a pulse may be selected to apply a desired average power.

In general, the term "power" is used to describe the power provided as an average over time (e.g., the time between sweeps).

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

As used herein the term "about" refers to ±10.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

As used herein, the term "treating" includes abrogating, substantially inhibiting, slowing or reversing the progression of a condition, substantially ameliorating clinical or aesthetical symptoms of a condition or substantially preventing the appearance of clinical or aesthetical symptoms of a condition.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

While the present invention has been described mainly in the context of thawing, the methods of the present invention, possibly at a higher frequency, can be used for baking and cooking or any other form of heating (not limited to kitchens), areas in which conventional microwave ovens are notoriously weak. In one example, when you heat a cheese pastry, the cheese heats faster than the pastry which may be rich in oils and the methods described above may be applied to ensure even heating. Another example is heating a sandwich with a more dissipating filling (e.g., meat, cheese, vegetables), in a manner which heats the sandwich and not the filling (or merely thaws the filling. Other examples include a dish of fish and salad (e.g., heat the fish/meat but not the vegetables) or a dish with meat or fish and rice/pasta (e.g., heat the rice more than the fish or vice versa, as shown above).

The invention claimed is:

1. A method of heating a load in a cavity, the method comprising:
    determining, for each of a plurality of frequencies, a dissipation ratio indicating a proportion of power dissipated in the load to power transmitted into the cavity;
    selecting one or more frequencies from the plurality of frequencies based on the dissipation ratio determined for each of the plurality of frequencies, wherein each of the selected one or more frequencies is associated with a corresponding dissipation ratio that is lower than a threshold; and
    applying RF energy to the load at the selected one or more frequencies.

2. The method of claim 1, further comprising:
    determining the dissipation ratio for each of the plurality of frequencies by sweeping the plurality of frequencies; and
    applying the RF energy to the load by sweeping the selected one or more frequencies to apply the RF energy to the load.

3. The method of claim 1, further comprising:
    determining an amount of energy to be transmitted at each of the selected one or more frequencies.

4. The method of claim 1, wherein:
    the one or more frequencies are selected based on the determined dissipation ratios and at least one of an input from a machine readable tag, a reading from a sensor, or information received from a user interface.

5. The method of claim 1, further comprising:
    after applying the RF energy to the load for a period of time, determining, for each of the plurality of frequencies, an updated dissipation ratio;
    selecting an updated set of one or more frequencies based on the updated dissipation ratios, wherein each of the one or more frequencies in the updated set is associated with an updated dissipation ratio that is lower than the threshold; and
    applying additional RF energy to the load at the one or more frequencies in the updated set.

6. An apparatus for heating a load in a cavity, the apparatus comprising a processor device configured to:
    determine, for each of a plurality of frequencies, a dissipation ratio indicating a proportion of power dissipated in the load to power transmitted into the cavity;
    select one or more frequencies from the plurality of frequencies based on the dissipation ratio determined for each of the plurality of frequencies, wherein each of the selected one or more frequencies is associated with a corresponding dissipation ratio that is lower than a threshold; and
    control a source to apply RF energy to the load at the selected one or more frequencies.

7. The apparatus of claim 6, wherein the processor is further configured to:
    determine the dissipation ratio for each of the plurality of frequencies by controlling the source to sweep the plurality of frequencies; and
    apply the RF energy to the load by controlling the source to sweep the selected one or more frequencies.

8. The apparatus of claim 6, wherein the processor is further configured to:
    determine an amount of energy to be transmitted at each of the selected one or more frequencies.

9. The apparatus of claim 6, wherein the processor is further configured to:
    select the one or more frequencies based on the determined dissipation ratios and at least one of an input from a machine readable tag, a reading from a sensor, or information received from a user interface.

10. The apparatus of claim 6, wherein the processor is configured to:
    after controlling the source to apply the RF energy to the load for a period of time, determine, for each of the plurality of frequencies, an updated dissipation ratio;

select an updated set of one or more frequencies based on the updated dissipation ratios, wherein each of the one or more frequencies in the updated set is associated with an updated dissipation ratio that is lower than the threshold; and
control the source to apply additional RF energy to the load at the one or more frequencies in the updated set.

\* \* \* \* \*